United States Patent [19]
Marrone, II

[11] Patent Number: 5,007,449
[45] Date of Patent: Apr. 16, 1991

[54] DEFLATOR

[76] Inventor: Anthony J. Marrone, II, 91-413B, Eva Beach Rd., Eva Beach, Hi. 96706

[21] Appl. No.: 459,685

[22] Filed: Jan. 2, 1990

[51] Int. Cl.$^5$ .................... F16K 15/18; F16K 31/44
[52] U.S. Cl. .................................. 137/223; 137/855; 251/342; 446/222
[58] Field of Search ............. 137/223, 522, 523, 852, 137/855; 251/4, 7, 342; 446/220, 222, 224; 81/15.4; 24/130, 30.5 S, 570

[56] References Cited

U.S. PATENT DOCUMENTS

| | | | |
|---|---|---|---|
| 1,104,028 | 7/1914 | Watson | 81/15.4 |
| 1,256,388 | 2/1918 | Stevens | 81/15.4 |
| 1,319,280 | 10/1919 | Hill | 81/15.4 |
| 1,396,646 | 11/1921 | Mellor | 81/15.4 |
| 2,271,370 | 1/1942 | Gora | 81/15.4 |
| 2,396,906 | 3/1946 | Windson | 446/222 |
| 2,734,308 | 2/1956 | Gassaway | 137/223 X |
| 2,755,060 | 7/1956 | Twyman | 251/342 |
| 2,942,614 | 6/1960 | Lardner | 137/223 |
| 2,946,555 | 7/1960 | Cantor | 251/342 |
| 3,056,408 | 10/1962 | Brown | 24/130 X |
| 3,257,695 | 6/1966 | Frame | 24/30.5 P |
| 3,925,852 | 12/1975 | Wood | 24/30.5 S |
| 4,307,869 | 12/1981 | Mittleman | 251/7 |
| 4,690,375 | 9/1987 | Vorhis | 251/342 |

FOREIGN PATENT DOCUMENTS 947559  1/1964  United Kingdom ................ 137/223

*Primary Examiner*—John Rivell
*Attorney, Agent, or Firm*—James F. Leggett

[57] ABSTRACT

A relatively thin, disk shaped device containing a slot in its face, which slot narrows as it reaches the center of the disk so that when it engages the valve stem of a cut-check valve, the valve is deformed without damage a sufficient degree so that the cut-check valve is unseated allowing air to pass either way through the cut-check valve.

4 Claims, 1 Drawing Sheet

DEFLATOR

BACKGROUND OF THE INVENTION

This invention relates generally to a device to allow deflating of inflatable objects equipped with cut-check values. The cut-check valve has become widely used in the manufacture of inflatable toys, all mattresses, rafts, etc. This valve is a single tube of suitable pliant material, such as plastic or rubber, with one end open and the other end closed. The check valve is accomplished by cutting a slit, approximately one-half the diameter of the tube, in wall of the tube near the closed end, which end extends inside the surface of the inflatable.

The cut-check valve must be opened in order for air to freely enter or escape from the inflatable. Prior to this invention, the valve had to be held open with a straw, placed through the length of the valve, or by manually squeezing the valve to unseat the check valve. Both of these methods were unsatisfactory because each required the use of at least one hand of the person inflating or deflating the inflatable, so that efforts to fold the inflatable or otherwise force air out of the inflatable by one person were frustrated because the valve would not stay open.

Applicant has commissioned a patent search to determine what methods of accomplishing his objectives were known and the results of the search disclosed no devices suitable for use to hold open cut-check valves as used in inflatables. There are devices to accomplish the same objective with tire check valves having stems, which stems are depressed to allow air to enter or escape, such as disclosed in U.S. Pat. Nos. 1,396,646, 1,319,280, 2,271,370, 1,104,028, and 1,256,388. Other U.S. Patents disclose the use of plastic disks to hold plastic bags or balloons closed, such as U.S. Pat. Nos. 3,257,695, 3,925,852, and 2,396,906.

It is the object of the present invention to provide a light weight, inexpensive, reusable device to hold open cut-check valves, such as those utilized in inflatables, such as toys, mattresses and rafts, etc., which will not damage the cut-check valve and free the hands of the person inflating or deflating the inflatable. Although this object and the preferred embodiment thereof are apparent from the drawings, description and claims set forth below, other manifestations of the invention will be obvious from these disclosures which do not materially deviate from the invention herein claimed.

SUMMARY OF THE INVENTION

The objects of this invention are accomplished by its preferred embodiment, a polystyrene disk, one-eighth inch thick and one and three-quarters inches in diameter, having cut into it a slot which tapers at a fixed rate from one-half inch wide at the perimeter of the disk to three-sixteenth inch wide at the base of the slot, said slot being one and one-eighth inch long. The slot of said disk is slid around the stem of the valve which protrudes from the surface of the inflatable until the stem deforms a sufficient amount so as to unseat the base of the cut-check valve inside the inflatable. The edges of the disk slot are rounded and smooth so as not to harm the valve stem and is left in place until the transfer of air is complete.

DESCRIPTION OF PREFERRED EMBODIMENTS

Figure 1:
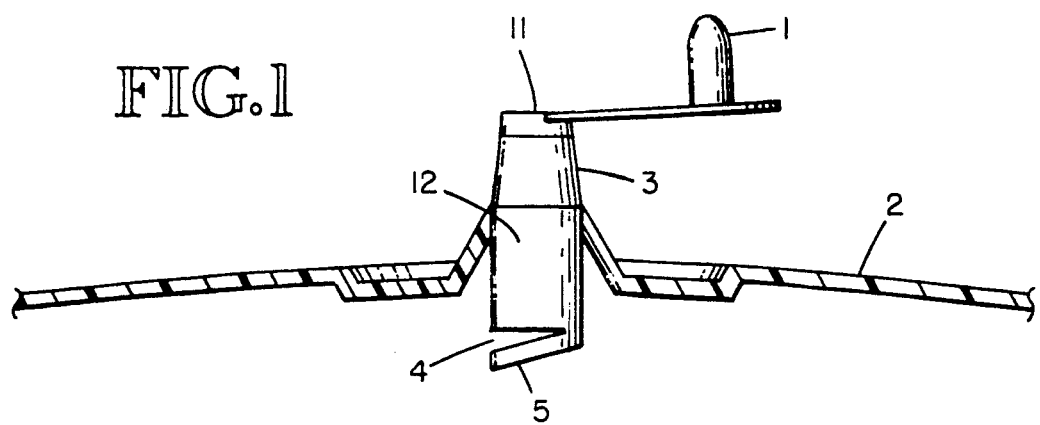
FIG. 1 is a plan view of the cut-check valve as installed on the surface of an inflatable.

With reference to the drawings, FIG. 1 shows a standard cut-check valve assembly as installed on the surface of an inflatable (2). The cut-check valve assembly is composed of a hollow tube (12) of uniform diameter and made of a suitably pliable material such as rubber or plastic. The end of the tube (12) which protrudes above the surface of the inflatable (2), referred to as the valve stem (3), has an end which is open (11), equipped with a stopper cap (1) that is removably affixed to the top of the tube (12). The end of the tube (12), which extends into the inside of the surface of the inflatable (2), is closed, but a short distance from the closed end, referred to as the valve seat (5), there is a slit cut perpendicular into the wall of the hollow tube (12), said slit penetrating at least one-half of the diameter of the hollow tube (12), which is the cut-check valve (4).

When air is forced through the open end of the tube (11), it pushes against the valve seat (5) which rotates to open the cut check valve (4). As the air pressure within the inflatable rises, the valve seat (5) exerts more and more resistance to the air flow from the open end of the tube (11) and tries to close the cut-check valve (4). When the desired air pressure is reached inside the inflatable, the stopper-cap (1) is inserted into the open end of the tube (11).

When it is desired to deflate the inflatable, the stopper-cap (1) is removed from the open end of the tube (11). However, due to the pressure of the air within the surface of the inflatable (2) acting against the valve seat (5), the cut-check valve (4) tends to close, thus making it difficult to rapidly force the air out of the inflatable.

Figure 2:
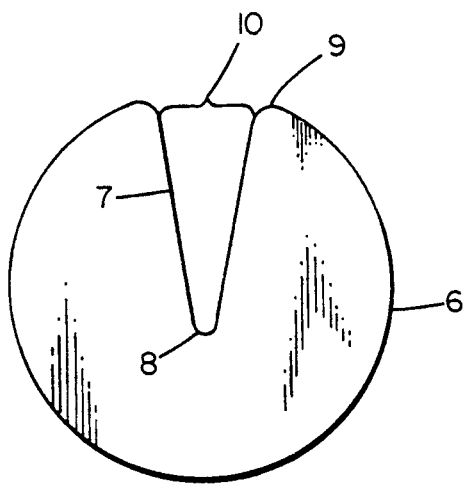
FIG. 2 is a plan view of the invention.

FIG. 2 illustrates a preferred embodiment of the invention. The embodiment is a disk (6) of suitable material, such as polystyrene, being of suitable diameter and thickness to accommodate the valve stem (3) of an inflatable within a slot (7) cut into its body and converging at a constant rate to its base (8), just beyond its center, so as to be approximately one-half the diameter of the valve stem (3) at its narrowest point and comfortable wider than the diameter of the valve stem (3) at its mouth (10). The edges of the slot (9) and its base (8) are curved so as to prevent damage to the surface of the inflatable (2) or the valve stem (3).

Figure 3:
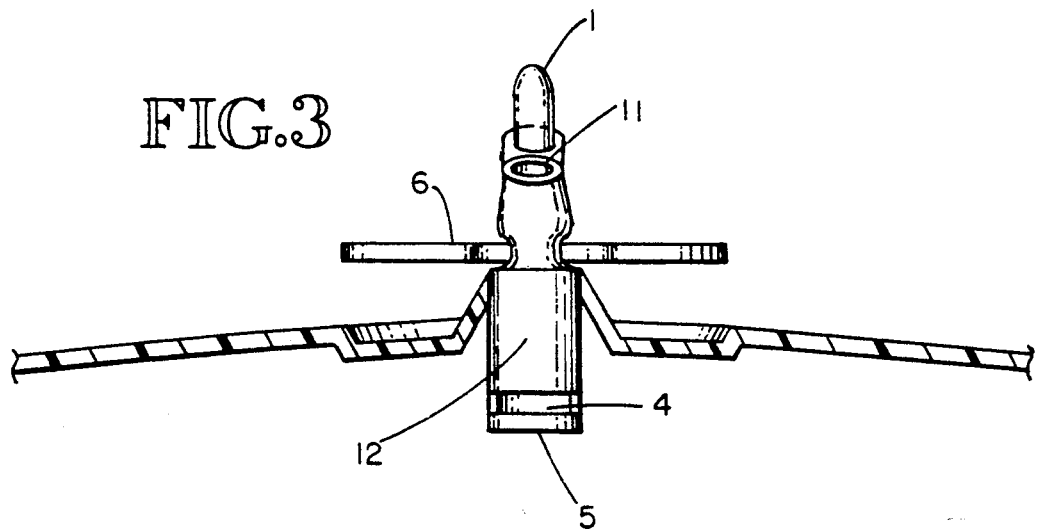
FIG. 3 is a frontal view showing the invention engaging the stem of the cut-check valve.

In order to hold the cut-check valve open, the mouth of the slot (10) of the invention is place around the valve stem (3) and the invention is moved passed the valve stem (3) so that the valve stem (3) is drawn toward the narrow end of the slot near the base (8). The sides of the slot compress the walls of the valve stem (3), as shown in FIG. 3, which results in changing the shape of the entire length of the hollow tube (12) so that the valve seat (5) no longer closes the cut check valve (4).

Thus the invention holds open the cut-check valve assembly allowing the person desiring to deflate the inflatable to use both hands to fold and compress the inflatable so that the air will be such as Numbers 3,257,695, 3,925,852, and 2,396,906. forced out faster. Other embodiments and applications of the invention will now become obvious to those skilled in the art without departing from the inventive concept of the invention. The scope of the invention disclosed herein is found by reference to the following claims.

I claim:

1. A deflating tool, for use in conjunction with cut-check valves, being constructed of suitable rigid material having a slot in its body of suitable length and width which tapers from the perimeter of the tool at a suitable fixed rate so as to accommodate the stem of the cut-check valve at its widest part and squeeze the valve stem, without damaging it, as the slot is moved passed the stem, so that the stem deforms a sufficient amount to open the cut-check valve, said surface of the deflating tool slot being smoothly finished so as not to damage the valve stem.

2. The deflating tool of claim 1 in which the suitable rigid material from which it is constructed is polystyrene and made in the general shape of a disk having a diameter of one and three-quarters inches and being one-eighth inch thick.

3. The deflating tool of claim 1 wherein the slot tapers at a fixed rate from one-half inch wide at the perimeter of the tool to three-sixteenth inch wide at the base of the slot, said slot being one and one-eighth inch long.

4. The deflating tool of claim 1 wherein the edges and base of the slot are curved and smooth.

* * * * *

UNITED STATES PATENT AND TRADEMARK OFFICE
CERTIFICATE OF CORRECTION

PATENT NO. : 5,007,449

DATED : Apr. 16, 1991

INVENTOR(S) : Anthony J. Morrone, II

It is certified that error appears in the above-identified patent and that said Letters Patent is hereby corrected as shown below:

On the title page, under items [19] and [54], "Marrone" should be --Morrone--.

Signed and Sealed this

Third Day of September, 1991

Attest:

HARRY F. MANBECK, JR.

*Attesting Officer*  *Commissioner of Patents and Trademarks*